(12) United States Patent
Leem et al.

(10) Patent No.: US 8,866,774 B2
(45) Date of Patent: Oct. 21, 2014

(54) LOW POWER TOUCH SCREEN OVERLAYS FOR PROVIDING TACTILE FEEDBACK

(75) Inventors: Larkhoon Leem, East Palo Alto, CA (US); Sonny Vo, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 299 days.

(21) Appl. No.: 13/536,966

(22) Filed: Jun. 28, 2012

(65) Prior Publication Data

US 2013/0002584 A1 Jan. 3, 2013

Related U.S. Application Data

(60) Provisional application No. 61/571,518, filed on Jun. 29, 2011.

(51) Int. Cl.
*G06F 3/041* (2006.01)
*G06F 3/0488* (2013.01)

(52) U.S. Cl.
CPC .. *G06F 3/04886* (2013.01); *G06F 2203/04809* (2013.01)
USPC .......................... 345/173; 340/407.1; 434/114

(58) Field of Classification Search
USPC ................. 345/173–179; 434/114; 340/407.1
See application file for complete search history.

(56) References Cited

U.S. PATENT DOCUMENTS

| | | | |
|---|---|---|---|
| 7,113,177 B2 | 9/2006 | Franzen | |
| 7,616,192 B2 | 11/2009 | Schroeder | |
| 2002/0106614 A1 | 8/2002 | Prince et al. | |
| 2005/0024342 A1 | 2/2005 | Young | |
| 2006/0109256 A1 | 5/2006 | Grant et al. | |
| 2008/0303782 A1 | 12/2008 | Grant et al. | |
| 2010/0097327 A1 | 4/2010 | Wadsworth | |
| 2010/0109486 A1* | 5/2010 | Polyakov et al. | 310/365 |
| 2010/0162109 A1* | 6/2010 | Chatterjee et al. | 715/702 |
| 2010/0182245 A1* | 7/2010 | Edwards et al. | 345/173 |
| 2010/0225596 A1* | 9/2010 | Eldering | 345/173 |
| 2012/0303839 A1* | 11/2012 | Jackson et al. | 710/15 |

* cited by examiner

*Primary Examiner* — Kevin M Nguyen
*Assistant Examiner* — Cory Almeida
(74) *Attorney, Agent, or Firm* — Lumen Patent Firm

(57) ABSTRACT

Tactile feedback for touch screens is provided by an overlay structure disposed on the top surface of the touch screen. This overlay structure can be in either of two states. In the first state (non-typing), the overlay structure has a uniform top surface. In the second state (typing), the overlay structure top surface has localized regions of increased vertical elevation to provide tactile feedback for typing. The overlay structure is configured to be switched between these two states by actuator(s) disposed to provide mechanical force(s) in lateral direction(s) to the overlay structure. Preferably, the actuator is a latching actuator (e.g., magnetic solenoid) that does not consume power to hold the overlay structure in either of its states. Thus, power is only consumed to switch the state of the overlay structure.

17 Claims, 8 Drawing Sheets

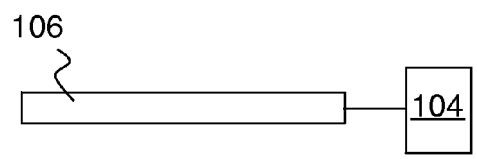
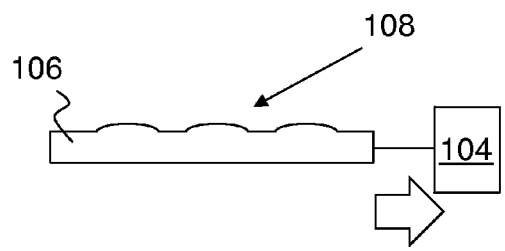
Fig. 3a  Fig. 3b
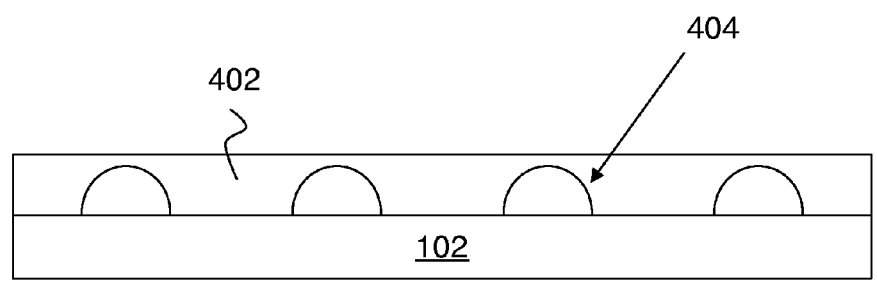
Fig. 4a
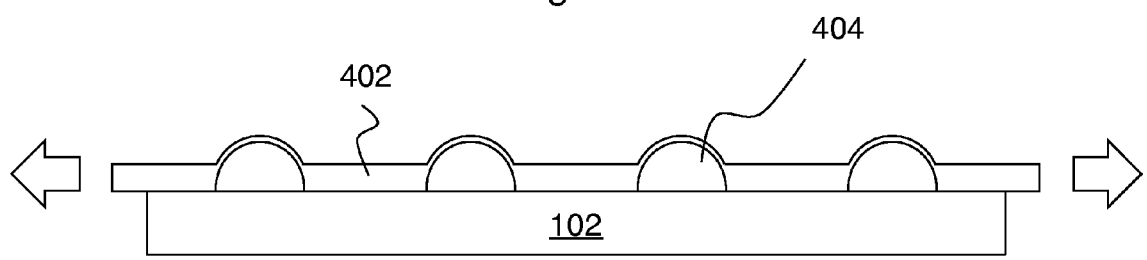
Fig. 4b

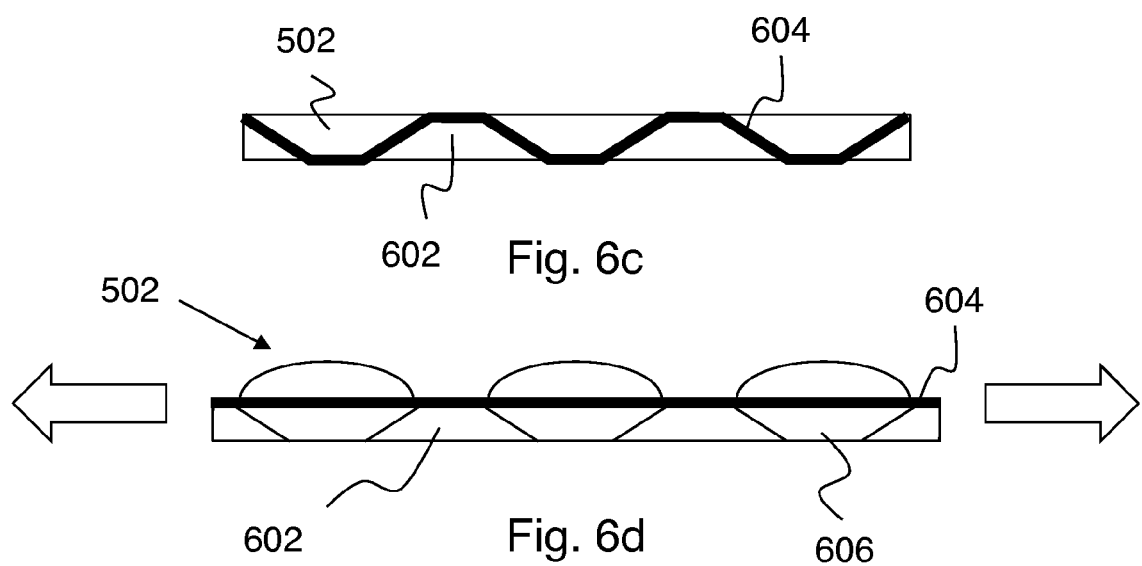

LOW POWER TOUCH SCREEN OVERLAYS FOR PROVIDING TACTILE FEEDBACK

CROSS REFERENCE TO RELATED APPLICATIONS

This application claims the benefit of U.S. provisional patent application 61/571,518, filed on Jun. 29, 2011, entitled "Magnetic levitation based tactile sensation touch screen", and hereby incorporated by reference in its entirety.

FIELD OF THE INVENTION

This invention relates to providing tactile feedback for touch screens.

BACKGROUND

Recent advances in technology have led to increasingly widespread use of devices that have touch screens for input, such as smart phones, tablets, etc. Experience with such devices has identified typing on touch screens as a significant source of practical problems. For example, one often needs to look at the keys of the touch screen (because they cannot be felt by touch), as opposed to what is being typed. This will undesirably increase typing errors. While most smart phones and tablets have auto-complete or auto-correct features, such auto-completion and auto-correction is also prone to errors and is often inefficient. Thus auto-correction is not a complete solution to touch screen typing problems.

Since tactile feedback is very helpful for typing, various attempts have been made in the art to provide tactile feedback for a touch screen. Generally, conventional tactile feedback approaches for touch screens tend to suffer from one or more of the following significant practical difficulties: excessively low vertical feature height, excessive power consumption by the tactile feedback system, and use of exotic and/or expensive materials.

Accordingly, it would be an advance in the art to provide tactile feedback for touch screens that does not suffer from the above-identified difficulties.

SUMMARY

In this work, tactile feedback for touch screens is provided by use of an overlay structure disposed on the top surface of the touch screen. This overlay structure can be in either of two states. In the first state (non-typing), the overlay structure has a uniform top surface. In the second state (typing), the overlay structure top surface has localized regions of increased vertical elevation to provide tactile feedback for typing. The overlay structure is configured to be mechanically switched between these two states by an actuator (or several actuators) disposed to provide mechanical force(s) in one or more lateral directions to the overlay structure. Although any kind of mechanical actuator can be employed, it is preferred that the actuator be a latching actuator that does not consume power to hold the overlay structure in either of its states. Thus, power is only consumed to switch the state of the overlay structure.

This approach provides several significant advantages. First, cost can be reduced. The overlay structure can be made of inexpensive materials such as polymer films, which is in sharp contrast to exotic and often costly materials that have been conventionally used for touch screen tactile feedback, such as shape memory alloys, piezo-electric materials, magneto-rheostatic fluidic materials, etc. Second, no active electronics (e.g., transistors) is needed to control the tactile feedback system. Third, power consumption can be reduced. No power is consumed while the overlay is in its second state (i.e., tactile keys/buttons present) in preferred embodiments where a latching mechanical actuator is employed. Fourth, this approach can provide any arrangement of tactile feedback keys by appropriately configuring the overlay structure. Thus, great flexibility can be obtained.

BRIEF DESCRIPTION OF THE DRAWINGS

FIGS. 3*a-b* show an embodiment of the invention that does not include a touch screen.
FIGS. 4*a-b* show a first exemplary embodiment.
FIGS. 6*a-d* show a third exemplary embodiment and a variant of this.

DETAILED DESCRIPTION

Figure 1A:
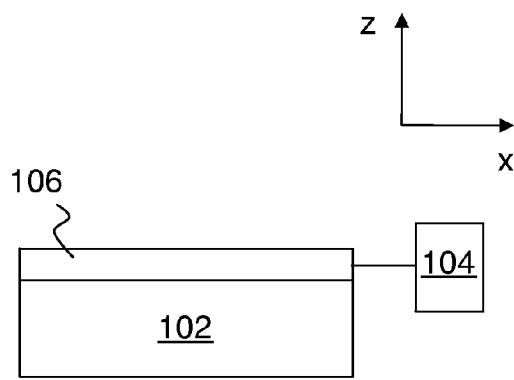
FIGS. 1*a-b* show side views of an embodiment of the invention.
Figure 1B:
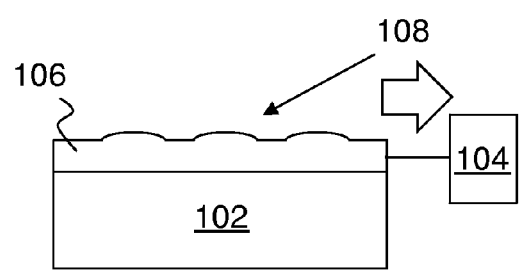
Figure 2A:
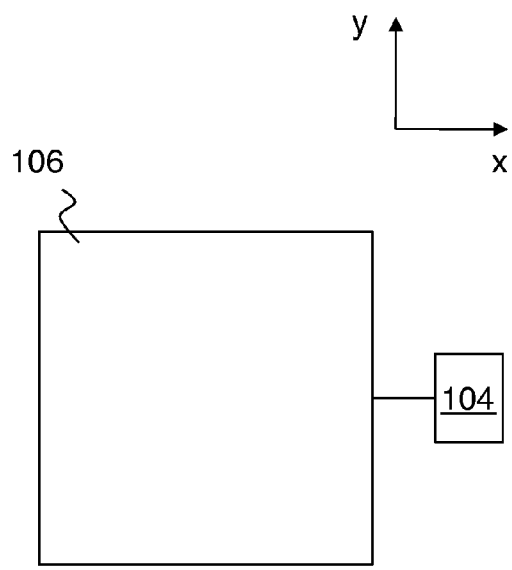
FIGS. 2*a-b* show top views corresponding to the side views of FIGS. 1*a-b*.
Figure 2B:
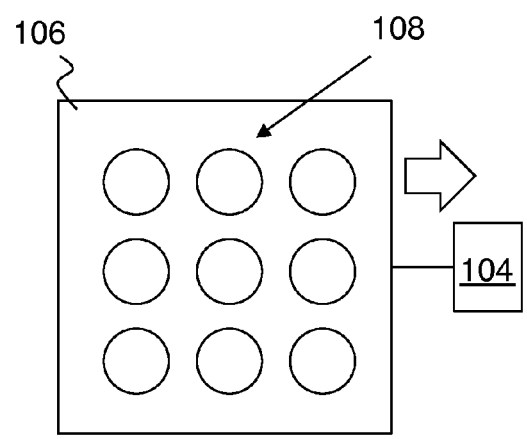

FIGS. 1*a-b* show side views of an embodiment of the invention. FIGS. 2*a-b* show top views corresponding to the side views of FIGS. 1*a-b*. Coordinate axes are shown on these figures such that the vertical direction is z and any direction in the x-y plane is a lateral direction. Thus height is perpendicular to the top surface of touch screen 102, and lateral directions are parallel to the top surface of the touch screen 102. Here an overlay structure 106 is disposed on a touch screen 102. To simplify the description, a touch screen is defined as any touch sensitive device that may or may not also provide a visual display. An actuator 104 is disposed to provide a lateral force to overlay structure 106. For simplicity, a single actuator and lateral force is shown. Multiple actuators and/or lateral forces can also be employed.

FIGS. 1*a* and 2*a* show the configuration of the overlay structure in its first state (non-typing). In this configuration overlay structure 106 has a substantially uniform top surface, making it suitable for any non-typing use of touch screen 102. In particular, the top view of FIG. 2*a* shows that overlay structure 106 is featureless in this state, so it will not interfere with other uses of touch screen 102.

FIGS. 1*b* and 2*b* show the configuration of the overlay structure in its second state (typing). In this configuration, the top surface of overlay structure 106 has increased z-height, relative to other parts of the overlay structure, at one or more predetermined lateral positions, thereby creating features 108. This increased height of features 108 is shown on FIG. 1*b*, and the top view of FIG. 2*b* shows that features 108 can serve as tactile keys, buttons, etc. since they are laterally separated and defined by height.

Actuator 104 is capable of switching overlay structure 106 between the above-defined states by application of lateral mechanical force(s) as described above. Preferably, actuator 104 has negligible power dissipation when the overlay structure is held in the first state or is held in the second state. It is convenient to refer to such an actuator as a latching actuator. Practice of the invention does not depend critically on details of the actuator. Any actuator capable of providing suitable mechanical forces can be employed. Suitable actuators include, but are not limited to: magnetic solenoid latches, micro-relays, and bimetals. An example of a bimetal actuator is two metals having different thermal expansion coefficients bonded together, so that a change in temperature (e.g., provided by a resistive heater) causes the bonded structure to deform, thereby providing a mechanical force.

In some embodiments, actuator 104 is a magnetic latching solenoid. Latching solenoids utilize an electrical current pulse to initially draw a moveable iron core near an internal permanent magnet material. When the iron core comes into proximity of the permanent magnet a set position is maintained without the constant application of an electrical current, which advantageously reduces power consumption. For the iron core to return to reset position, current flows in the opposite direction to draw the iron core away from the permanent magnet. A restoration force from an internal spring can be added to facilitate this process. Suitable magnetic latching solenoids are commercially available.

Touch screen 102 is responsive to touch provided to overlay structure 106 at the features formed in overlay structure 106 when the overlay structure is in the second state. Thus, it is important that the overlay structure be sufficiently thin so as to permit this. Practice of the invention does not depend critically on the touch screen technology being used. Any touch screen capable of sensing touch through the overlay structure can be employed. One example of a suitable touch screen technology is touch screens based on sensing electrical capacitance. Capacitive touch screens are capable of sensing touch through overlay structures of reasonable total thickness approximately less than 5 mm.

As indicated above, this approach is applicable to touch screen that may or may not also provide a visible display. However, touch screens that provide a visual display are significant applications in practice. Therefore, it is often preferred for the overlay structure to be substantially transparent to visible light, so that the visual display of the touch screen is visible through the overlay structure. In cases where the overlay structure includes two or more layers, it is preferred for the layers to have matching indices of refraction. Alternatively, suitable anti-reflection coating(s) can be disposed at interface(s) between layers. Such coatings can also be employed at the interface between the touch screen and the overlay structure, and at the top surface of the overlay structure.

Preferably, multiple keys/buttons are activated simultaneously in the second state of the overlay structure. For example, a physical Qwerty keyboard, number pad, etc. can appear when a latching solenoid is activated and can disappear when it is reset. Buttons under tactile pressure restore to their raised position as soon as the tactile pressure is removed, which is exactly the same behavior as normal buttons. This is possible because the overlay structure will elastically restore itself to the raised-button configuration as long as it is held in its second state by the actuator. Since maintaining this second state need not consume any power at the actuator, no power is required to restore button/key positions after they are pressed.

Practice of the invention does not depend critically on the materials used for the overlay structure. Any materials capable of providing sufficient tactile feedback feature that are also compatible with the touch screen (e.g., providing sufficient visibility) can be employed. Transparent polymers tend to be suitable.

Some embodiments of the invention include a touch screen having an overlay structure+mechanical actuator as described above. Other embodiments of the invention include the overlay structure and mechanical actuator as described above, but do not include the touch screen. Such embodiments may be regarded as kits that can be applied to an otherwise conventional touch screen in order to provide tactile feedback according to the present principles. FIGS. 3*a-b* show an embodiment of the invention that does not include a touch screen.

Embodiments of the invention, whether built-in with the touch screen or applied to a touch screen as a kit, can be provided with software control. For example, when a software application displays a keyboard, keypad, number pad etc., the overlay structure can be driven to its second state (raised tactile features) under software control. This advantageously provides tactile features coordinated with the displayed keyboard etc.

In general, any overlay structure that can provide areas of raised vertical elevation in response to lateral mechanical force(s) can be used to provide tactile feedback for touch screens. The following description provides several illustrative examples.

In some embodiments, the overlay structure can have inclusions embedded in an elastomer, where the inclusions are more mechanically rigid than the elastomer. The differing mechanical properties of the materials in such configurations can be exploited to provide tactile feedback features when the overlay structure is subject to lateral force(s).

FIGS. 4*a-b* show an example of this approach. In this example, the overlay structure includes isolated buttons or knobs 404 of a relatively hard transparent elastomer embedded within a relatively soft elastomer 402. This arrangement can be regarded as "islands" of hard elastomer 404 embedded in soft elastomer 402, where features 404 are more mechanically rigid than elastomer 402. In the first state (FIG. 4*a*), the buttons/knobs 404 are flush with the top surface of elastomer 402. In the second state (FIG. 4*b*), the buttons/knobs 404 are exposed to provide tactile feedback. Lateral tension applied to elastomer 402 in the second state tends to preferentially decrease its thickness compared to features 404, thereby exposing the features.

Figure 5A:
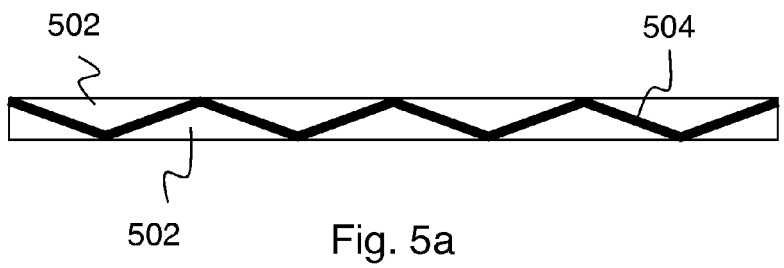
FIGS. 5*a-b* show a second exemplary embodiment.
Figure 5B:
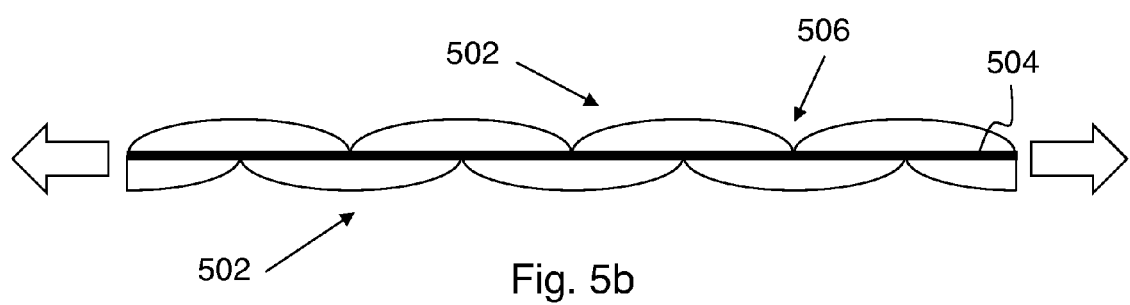
Figure 6A:
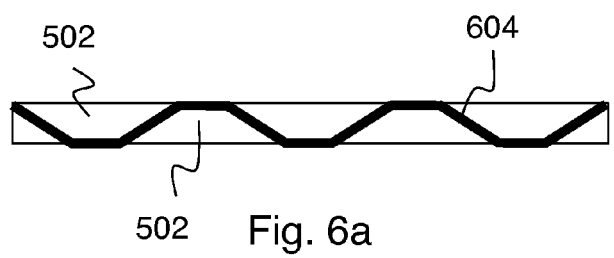
Figure 6B:
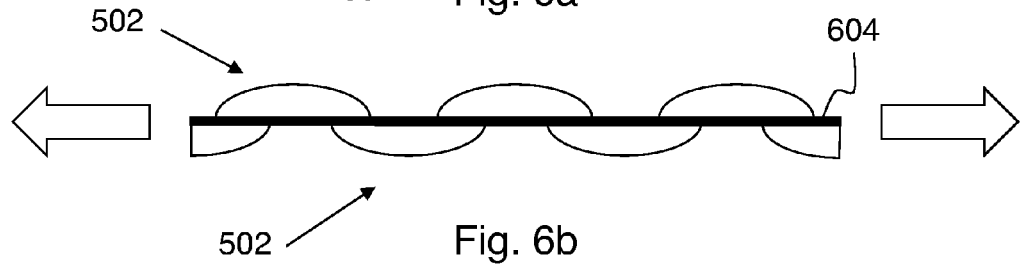

Another example of the use of different mechanical properties is shown on FIGS. 5*a-b*. Here the overlay structure includes elastomer 502 and an inclusion 504 having a substantially zig-zag configuration in the first state (FIG. 5*a*). Inclusion 504 is more mechanically rigid than elastomer 502. For example, inclusion 504 can be an elastomer that is substantially more rigid than elastomer 502. Therefore, in the second state of the overlay structure (FIG. 5*b*), inclusion 504 straightens out under lateral tension to a substantially planar configuration and elastomer 502 deforms accordingly, thereby providing tactile feedback features. The dips between the features serve to separate the buttons. One of these dips is referenced as 506 on FIG. 5*b*. FIGS. 6*a-b* show an example where the first state of the overlay structure has a zig-zag configuration of inclusion 604 that includes flat regions. As can be seen from FIG. 6*b*, these flat regions serve to increase the separation and spacing of the tactile feedback features, which can be helpful in practice. This separation can be varied as needed by appropriate design of inclusion 604 in the overlay structure.

FIGS. 6*c-d* show a variant of the example of FIGS. 6*a-b*. In this example, bottom material 602 is not attached to inclusion 604 on its entire surface. Upon application of lateral tension, the resulting configuration has gaps 606 below the raised features 502 as seen on FIG. 6*d*. More specifically, the separation between inclusion 604 and the slanted surfaces of material 602 on FIG. 6*d* shows that these slanted surfaces are not attached to inclusion 604.

Another approach for providing tactile feedback features in response to lateral force relies on having a top layer and bottom layer of the overlay structure mate at an interface having a saw tooth configuration. Here the top layer is elastic (e.g., an elastomer such as PDMS (polydimethylsiloxane)) and the bottom layer is preferably more rigid than the top layer. Lateral motion of the bottom layer with respect to the top layer can cause tactile feedback features to form in the elastic top layer. As indicated above, it is preferred for the top layer to remain in a fixed position, and that the relative motion of the top and bottom layers be accomplished by moving only the bottom layer.

Figure 7A:
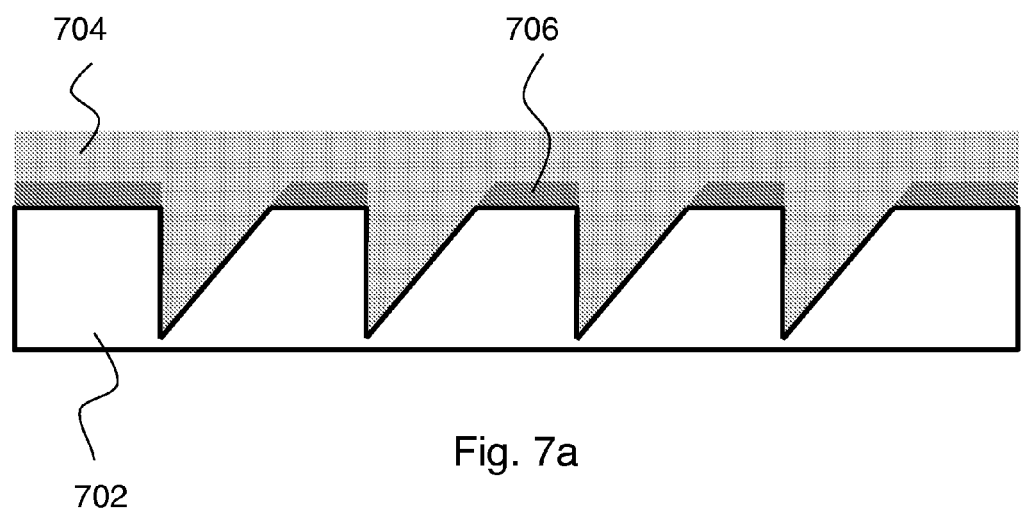
FIGS. 7*a-b* show a fourth exemplary embodiment.
Figure 7B:
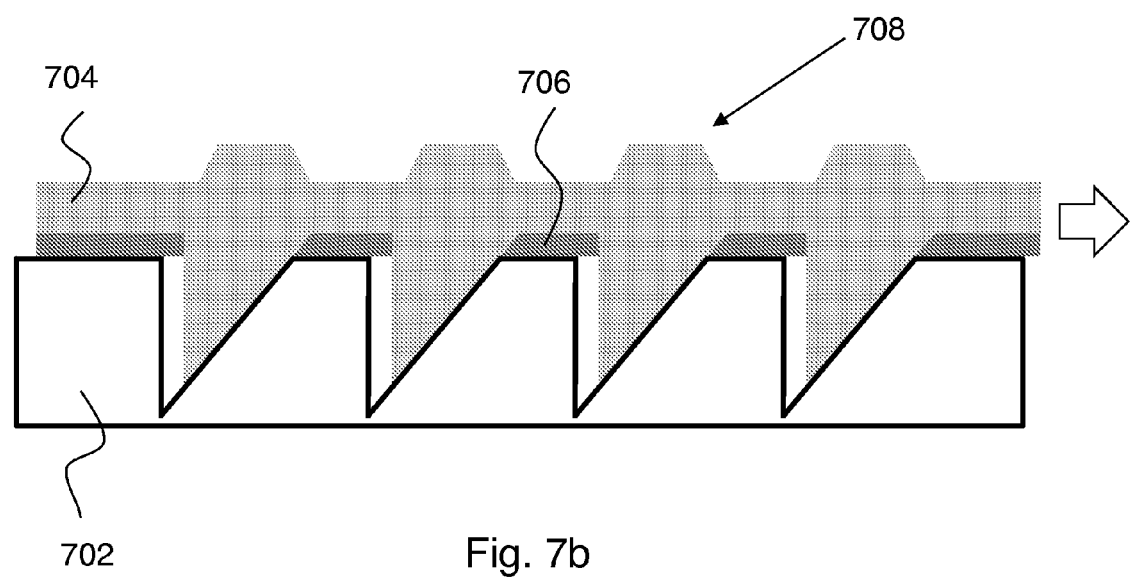
Figure 8A:
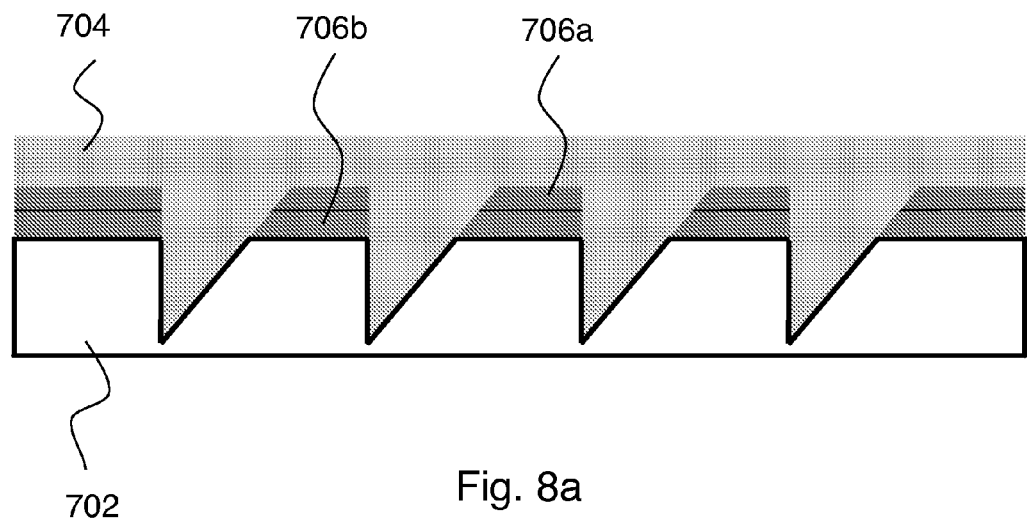
FIGS. 8*a-b* show a fifth exemplary embodiment.
Figure 8B:
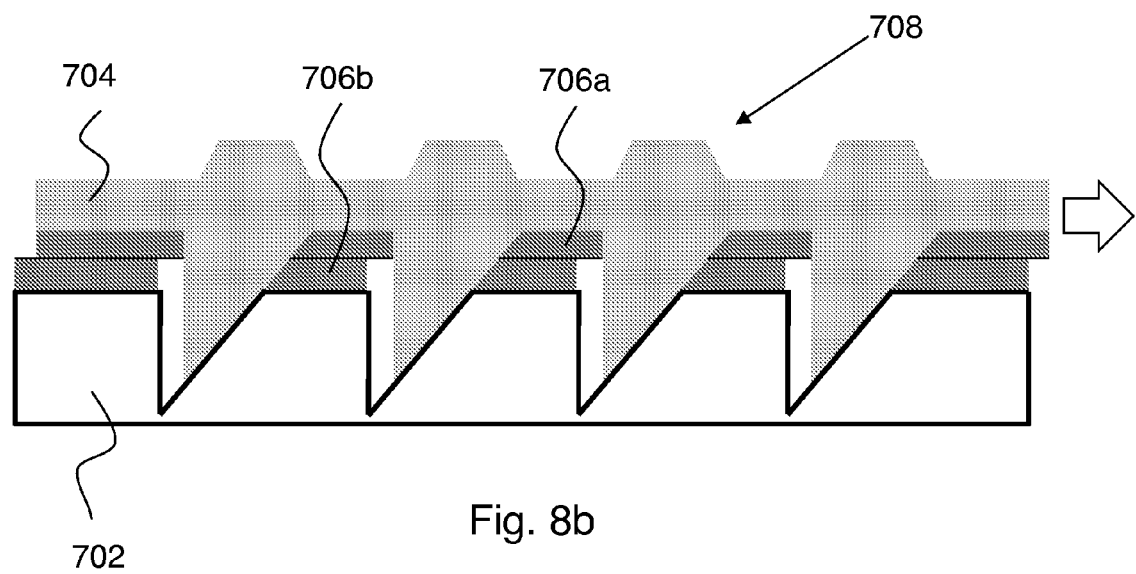

FIGS. 7a-b show an example of this approach. Here, top layer 704 and bottom layer 702 mate in a saw tooth configuration as shown. Optionally, an interface layer 706 can be present, to provide lubrication, match indices of refraction etc. In the first state (FIG. 7a), top layer 704 fits completely into the features of bottom layer 702, thereby providing a uniform top surface. In the second state (FIG. 7b), the bottom layer 702 is displaced laterally with respect to the top layer, thereby forming features 708 by elastic deformation of top layer 704. FIGS. 8a-b show a similar example, where two interface layers 706a and 706b are employed. Any number of interface layers can be used. The top and bottom layers can have different compositions or they can have the same composition (which can help reduce interface reflections).

Another approach for providing tactile features relates to overlay structures having a top layer and a bottom layer, where the bottom layer is disposed on the touch screen and the top layer is elastic. Altering the mechanical configuration of the bottom layer can provide tactile features by elastic deformation of the top layer.

In this approach, the top layer of the overlay structure is the external layer that can be touched by a user. A generally useful configuration is where the top layer is an elastic layer of uniform thickness and having no lateral features inherent in the top layer. The bottom layer has lateral features that can change their configuration depending on the state of the overlay structure. The actuator moves the bottom layer with respect to the top layer to change state. Thus, the externally facing top layer does not move relative to the touch screen, and the features of the bottom layer are protected from environmental contamination (dust etc.) by the top layer.

The top layer covers the features in the bottom layer. Typically, the top layer is softer and thicker than the bottom layer. Thus, the top layer can provide an elastic restoration force to the overlay structure so that when the actuator is in the first state, the bottom layer is flattened out by elastic forces provided by the top layer, thereby returning the overlay structure to its non-typing state (i.e., uniform height). In other embodiments, the bottom (or top and bottom layers together) can provide the elastic restoring force. Furthermore, the top layer can prevent users from sensing (by touch) the patterns in the bottom layer in the non-typing state. This is helpful, since users are preferably not distracted by the overlay structure when it is in its non-typing state.

Figure 9A:
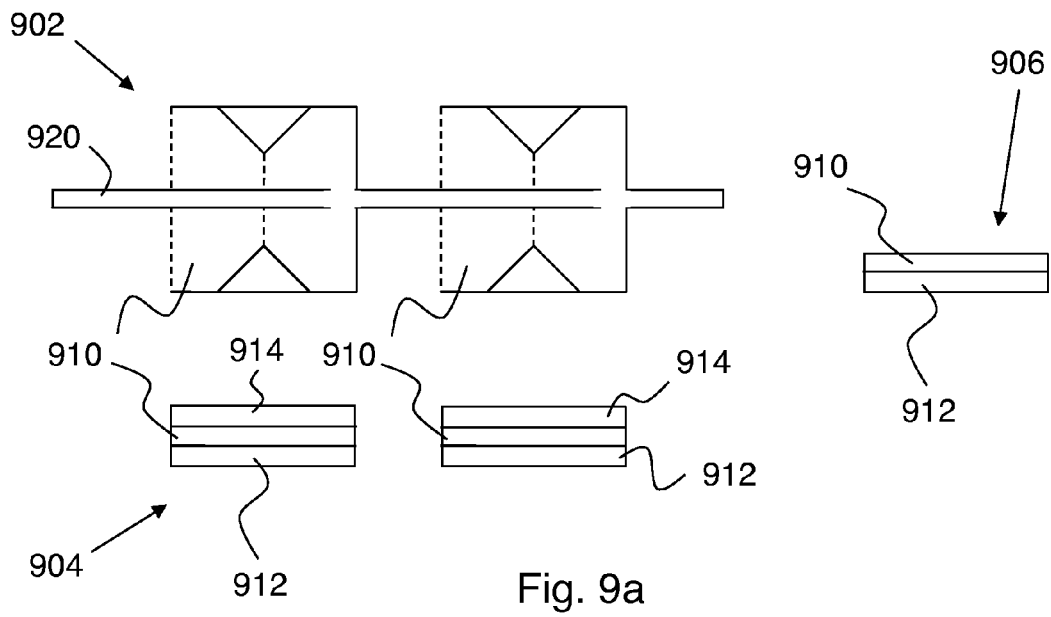
FIGS. 9*a-b* show a sixth exemplary embodiment.
Figure 9B:
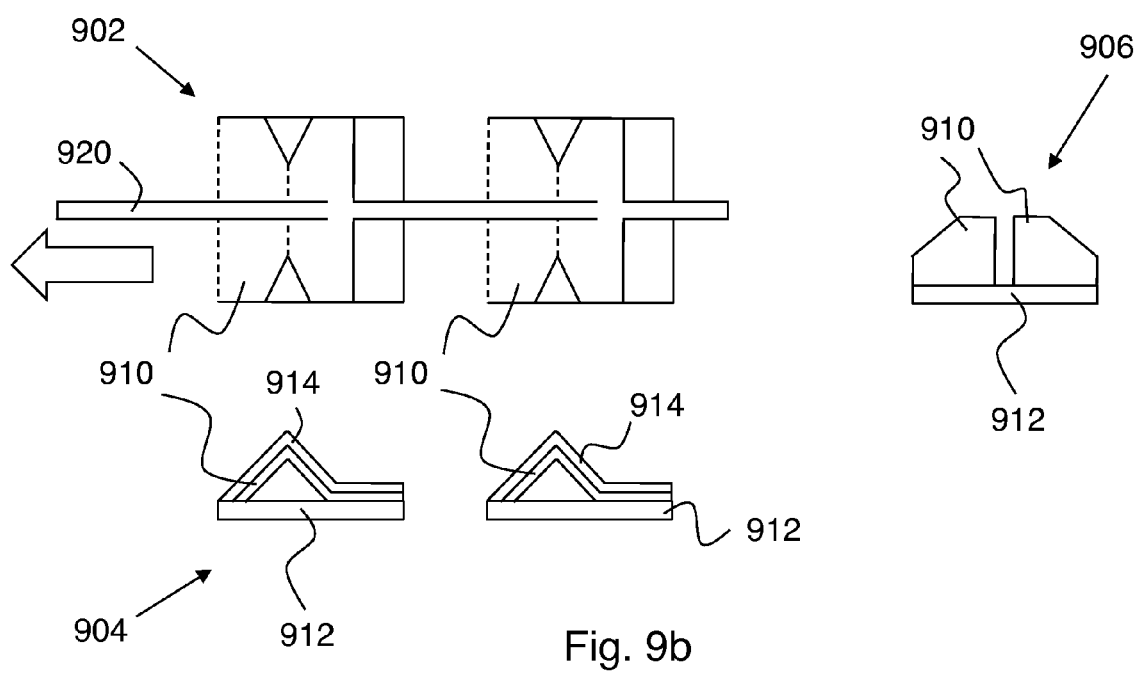

FIGS. 9a-b show an example of this approach. Here, top views are referenced as 902, side views are referenced as 904, and end views are referenced as 906. FIG. 9a relates to the first state of the overlay structure (flat top surface) and FIG. 9b relates to the second state of the overlay structure (raised tactile features). Here the overlay structure has a top layer 914 and a bottom layer 910, and this assembly is disposed on touch screen 912. To aid in visualization, top layer 914 is only shown on the side view 904. This way, the top view shows the features of the bottom layer that provide the tactile feedback.

In this example, a strap 920 is attached to the bottom layer. As a result of the features of bottom layer 910, a lateral force applied on strap 920 can cause bottom layer 910 to deform to tent-like shapes (as shown). Fold lines for layer 910 are schematically shown with dotted lines. In practice, the desired fold lines can be defined by mechanically scoring the bottom layer. This example shows two cells connected to the same strap. Any number of cells can be connected to the same strap (e.g., an entire row of a Qwerty keyboard could be raised and lowered by controlling a single strap).

Figure 10A:
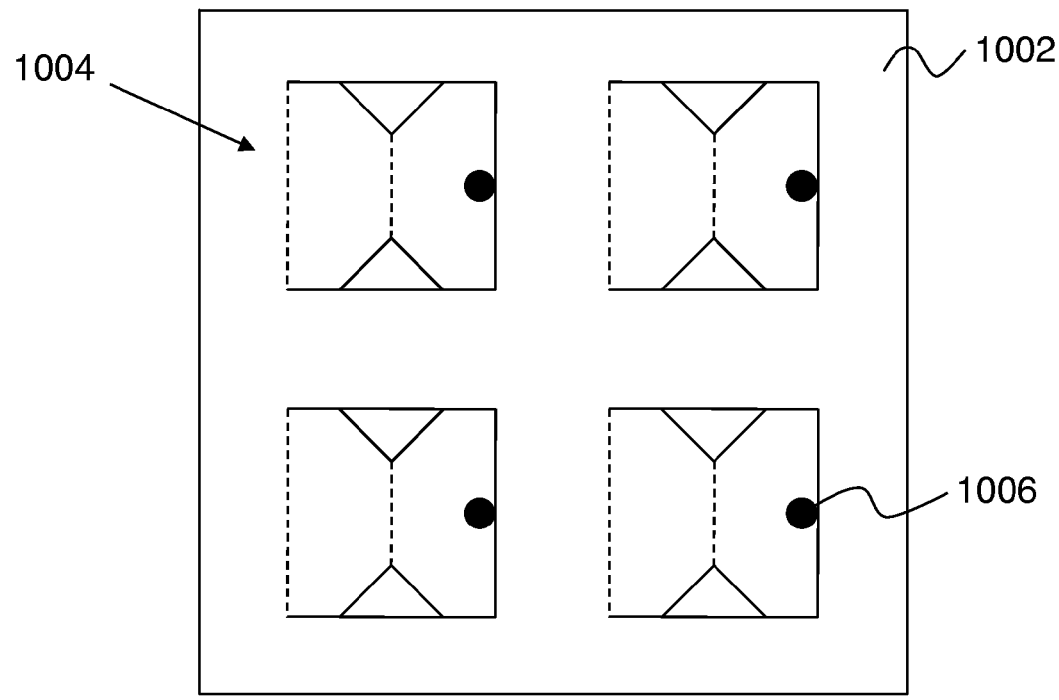
FIGS. 10*a-b* show a seventh exemplary embodiment.
Figure 10B:
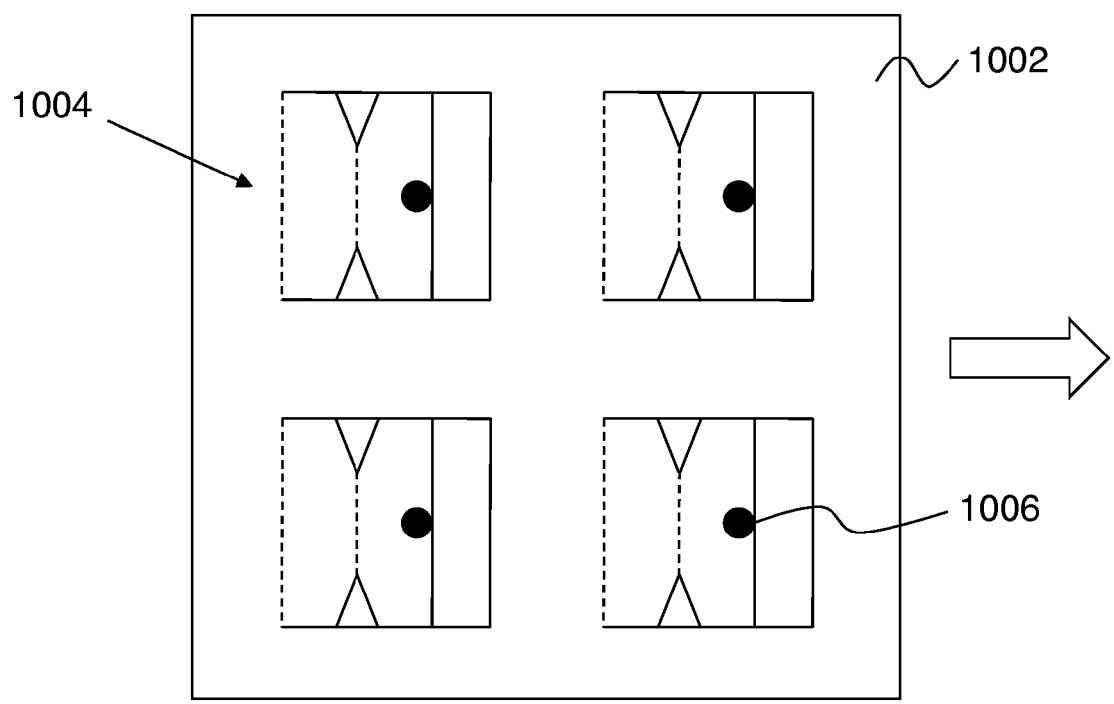

FIGS. 10a-b show a second example of a bottom layer having a mechanical configuration that changes. As in the example of FIGS. 9a-b, tent-like shapes are formed in bottom layer 1002. Bottom layer 1002 has a fixed attachment point 1006 in each cell 1004. To avoid clutter on the figure, only one of the attachment points is referenced. FIG. 10a shows the first state of the overlay structure (i.e., bottom layer 1002 is flat). FIG. 10b shows the second state of the overlay structure (i.e., bottom layer 1002 has tent-like features). Here, the attachment points remain in a fixed location as bottom layer 1002 is moved, thereby causing tent-like features to form in cells 1004. Attachment points 1006 can be formed by locally affixing parts of bottom layer 1002 to the touch screen and/or to the top layer.

This general approach can be scaled to various sizes: from smart-phones to tablets and even to large-size touch screen displays without limitation in size. For the case of devices whose orientation can be rotated, different orientations of the pattern can be laid down on the device. Moreover, the latching solenoid or actuation mechanism can be placed in any or all sides of the device.

The invention claimed is:

1. Apparatus comprising:
   a) a touch screen having a top surface, wherein a vertical height direction is perpendicular to the top surface of the touch screen, and wherein lateral directions are parallel to the top surface of the touch screen;
   b) an overlay structure disposed on the top surface of the touch screen, wherein the overlay structure is capable of being actuated between a first state and a second state by a mechanical force applied in one or more lateral directions to one or more lateral edges of the overlay structure; and
   c) an actuator capable of actuating the overlay structure to be in the first state or in the second state;
   wherein the first state of the overlay structure is a configuration wherein the overlay structure has a substantially uniform top surface;
   wherein the second state of the overlay structure is a configuration wherein the top surface of the overlay structure has increased z-height, relative to other parts of the overlay structure, at one or more predetermined lateral positions; and
   wherein the touch screen is responsive to touch provided to the overlay structure at the one or more predetermined lateral positions when the overlay structure is in the second state.

2. The apparatus of claim 1, wherein the overlay structure comprises a first elastomer having one or more inclusions that are more mechanically rigid than the first elastomer, and wherein the overlay structure is actuated between the first and second states by providing lateral tension to the overlay structure with the actuator.

3. The apparatus of claim 2, wherein the one or more inclusions comprise a film embedded into the overlay structure such that the film has a substantially zig-zag configuration in the first state, and has a substantially planar configuration in the second state.

4. The apparatus of claim 2, wherein the one or more inclusions comprise localized bodies of a second elastomer disposed at the predetermined lateral positions.

5. The apparatus of claim 1, wherein the overlay structure comprises an elastic top layer and a bottom layer disposed on the touch screen, wherein the top and bottom layers mate at an interface having a saw tooth configuration, and wherein the overlay structure is actuated between the first and second states by laterally moving the top layer with respect to the bottom layer.

6. The apparatus of claim 5, further comprising one or more lubrication layers disposed at the interface.

7. The apparatus of claim 1, wherein the overlay structure comprises an elastic top layer and a bottom layer disposed on the touch screen, and wherein the overlay structure is actuated between the first and second states by altering a mechanical configuration of the bottom layer.

8. The apparatus of claim 7, wherein the bottom layer comprises one or more straps capable of deforming the bottom layer to provide tent-like shapes when lateral tension is applied to the straps.

9. The apparatus of claim 7, wherein the bottom layer is affixed to the touch screen at one or more localized attachment locations, whereby tent-like shapes can form in the bottom layer when the bottom layer is moved in a lateral direction.

10. The apparatus of claim 7, wherein the elastic top layer has the same lateral position in the first and second states of the overlay structure.

11. The apparatus of claim 1, wherein the overlay structure is substantially transparent to visible light.

12. The apparatus of claim 11, wherein the overlay structure includes two or more transparent materials having substantially matched indices of refraction.

13. The apparatus of claim 1, wherein the touch screen is capable of providing a visual display that is visible through the overlay structure.

14. The apparatus of claim 1, wherein the actuator has negligible power dissipation when the overlay structure is held in the first state or is held in the second state.

15. The apparatus of claim 1, wherein the actuator comprises an actuator selected from the group consisting of: magnetic solenoid latch, micro-relay, and bimetals.

16. The apparatus of claim 1, wherein the touch screen senses touch via electrical capacitance.

17. Apparatus capable of being disposed on a touch screen, the apparatus comprising:
 a) an overlay structure configured to be disposed on a top surface of the touch screen, wherein a vertical height direction is perpendicular to a top surface of the touch screen, and wherein lateral directions are parallel to the top surface of the touch screen, wherein the overlay structure is capable of being actuated between a first state and a second state by a mechanical force applied in one or more lateral directions to one or more lateral edges of the overlay structure; and
 b) an actuator capable of actuating the overlay structure to be in the first state or in the second state;
 wherein the first state of the overlay structure is a configuration wherein the overlay structure has a substantially uniform top surface;
 wherein the second state of the overlay structure is a configuration wherein the top surface of the overlay structure has increased z-height, relative to other parts of the overlay structure, at one or more predetermined lateral positions; and
 wherein the touch screen is responsive to touch provided to the overlay structure at the one or more predetermined lateral positions when the overlay structure is in the second state.

* * * * *